(12) United States Patent
Sanders et al.

(10) Patent No.: US 8,016,907 B2
(45) Date of Patent: Sep. 13, 2011

(54) QUICK DRYING POLYMERIC COATING

(75) Inventors: John Larry Sanders, Leawood, KS (US); Grigory Mazo, Wilmette, IL (US); Jacob Mazo, Wilmette, IL (US)

(73) Assignee: Specialty Fertilizer Products, LLC, Leawood, KS (US)

( * ) Notice: Subject to any disclaimer, the term of this patent is extended or adjusted under 35 U.S.C. 154(b) by 0 days.

(21) Appl. No.: 12/948,625

(22) Filed: Nov. 17, 2010

(65) Prior Publication Data

US 2011/0048087 A1 Mar. 3, 2011

Related U.S. Application Data

(63) Continuation of application No. 12/651,356, filed on Dec. 31, 2009, which is a continuation-in-part of application No. 12/351,589, filed on Jan. 9, 2009.

(51) Int. Cl.
| | |
|---|---|
| C05D 9/02 | (2006.01) |
| C05C 9/00 | (2006.01) |
| A01N 25/00 | (2006.01) |
| A01N 63/00 | (2006.01) |
| A01N 59/14 | (2006.01) |

(52) U.S. Cl. .................. 71/11; 71/27; 71/28; 71/64.03; 71/64.07; 504/116.1; 504/118; 504/122

(58) Field of Classification Search .................. 71/1, 11, 71/27, 28, 29, 30, 31, 33, 35, 64.02, 64.03, 71/64.04, 64.05, 64.07, 903; 504/115, 116.1, 504/118, 122, 153, 164, 187, 189, 193, 313, 504/320, 361; 525/327.5, 327.8, 418; 528/72, 528/266, 269, 270, 271, 277, 314, 318.2, 528/318.43, 318.3, 319, 321, 325, 330
See application file for complete search history.

(56) References Cited

U.S. PATENT DOCUMENTS

| | | | |
|---|---|---|---|
| 2,616,849 A | 11/1952 | Giammaria | |
| 2,625,471 A | 1/1953 | Mowry et al. | |
| 2,625,529 A | 1/1953 | Hedrick et al. | |
| 2,651,885 A | 9/1953 | Hedrick et al. | |
| 2,652,379 A | 9/1953 | Hedrick et al. | |
| 2,652,380 A | 9/1953 | Hedrick et al. | |
| 2,703,276 A | 3/1955 | Hedrick et al. | |
| 2,883,298 A | 4/1959 | Meadows | |
| 3,268,491 A | 8/1966 | Yoshiaki et al. | |
| 3,274,731 A | 9/1966 | Vigneault et al. | |
| 3,318,851 A | 5/1967 | Nicholls et al. | |
| 4,005,250 A | 1/1977 | Greiner | |
| 4,129,435 A | 12/1978 | Takematsu et al. | |
| 4,245,076 A | 1/1981 | Marquardt | |
| 4,439,488 A | 3/1984 | Trimnell et al. | |
| 4,626,277 A | 12/1986 | Suzuki et al. | |
| 4,801,498 A * | 1/1989 | Duvdevani et al. | 428/334 |
| 5,047,078 A | 9/1991 | Gill | |
| 5,399,639 A | 3/1995 | Kimpton et al. | |
| 5,593,947 A | 1/1997 | Kinnersley et al. | |
| 5,597,400 A | 1/1997 | Nonomura et al. | |
| 5,861,356 A | 1/1999 | Koskan et al. | |
| 5,868,964 A | 2/1999 | Borseth et al. | |
| 5,935,909 A | 8/1999 | Sanders | |
| 6,018,010 A | 1/2000 | Yamazaki et al. | |
| 6,187,074 B1 | 2/2001 | von Locquenghien et al. | |
| 6,287,359 B1 | 9/2001 | Erhardt et al. | |
| 6,309,439 B1 | 10/2001 | von Locquenghien et al. | |
| 6,312,493 B1 | 11/2001 | Eltink et al. | |
| 6,488,734 B1 | 12/2002 | Barth et al. | |
| 6,515,090 B1 | 2/2003 | Sanders et al. | |
| 6,518,382 B2 | 2/2003 | Sanders et al. | |
| 6,525,155 B2 | 2/2003 | Sanders et al. | |
| 6,703,469 B2 | 3/2004 | Sanders et al. | |
| 6,706,666 B2 | 3/2004 | Hasebe et al. | |
| 6,930,139 B2 | 8/2005 | Sanders et al. | |
| 7,396,886 B2 | 7/2008 | Kwak et al. | |
| 7,655,597 B1 | 2/2010 | Sanders | |
| 7,666,241 B2 | 2/2010 | Sanders et al. | |
| 7,686,863 B1 | 3/2010 | Sanders | |
| 7,736,412 B1 | 6/2010 | Sanders | |
| 2004/0023031 A1 | 2/2004 | Sanders et al. | |
| 2005/0115290 A1 | 6/2005 | Sanders et al. | |
| 2006/0229383 A1 | 10/2006 | Noami et al. | |
| 2007/0224233 A1 | 9/2007 | Maekawa et al. | |
| 2008/0173053 A1 | 7/2008 | Sanders et al. | |
| 2009/0069346 A1 | 3/2009 | Ishihara et al. | |
| 2009/0099305 A1 | 4/2009 | Schroder et al. | |
| 2009/0118125 A1 | 5/2009 | Kobayashi et al. | |
| 2009/0163365 A1 | 6/2009 | Bentlage et al. | |
| 2009/0217723 A1 | 9/2009 | Sanders | |
| 2010/0099566 A1 | 4/2010 | Bobnock | |
| 2010/0139347 A1 | 6/2010 | Barati | |
| 2010/0175442 A1 | 7/2010 | Sanders et al. | |
| 2010/0175443 A1 | 7/2010 | Sanders | |
| 2010/0175444 A1 | 7/2010 | Sanders et al. | |

FOREIGN PATENT DOCUMENTS

| | | |
|---|---|---|
| JP | 63230587 | 9/1988 |

(Continued)

OTHER PUBLICATIONS

"Nutrisphere-N. For Liquid Nitrogen Fertilizers" MSDS (Mar. 6, 206) pp. 1-4.*

(Continued)

*Primary Examiner* — Jerry A Lorengo
*Assistant Examiner* — Jennifer Smith
(74) *Attorney, Agent, or Firm* — Hovey Williams LLP

(57) ABSTRACT

Improved agriculturally useful products are provided, including solid materials such as nitrogenous fertilizers (e.g., urea), together with a polycarboxylated polymer selected from the group consisting of a salts of copolymers containing individual quantities of maleic and itaconic moieties. The polymer composition also includes from about 10-60% by weight of an organic drying agent such as a lower alcohol which enhances the quick drying properties thereof. The compositions may also include an amount of boron, and bimodal vinylic polymer made up of quantities of high and low molecular weight (MW) vinylic polymers such as PVA.

15 Claims, No Drawings

FOREIGN PATENT DOCUMENTS

| | | |
|---|---|---|
| JP | 05178701 | 7/1993 |
| WO | WO 9715367 | 5/1997 |
| WO | WO 2009028583 | 3/2009 |

OTHER PUBLICATIONS

"Nutrisphere-N. For Enhanced Nitrogen Use Eficiency" SFP (Aug. 21, 2006) pp. 1-25.*

Presently available label for prior art product commercially available under the trade name "NutriSphere-N® for Granular Nitrogen Fertilizers" from Specialty Fertilizer Products, LLC (publication date unknown, printed from the web on Sep. 9, 2010, available at http://www.nutrisphere-n.com/products.aspx).

Presently available label for prior art product commercially available under the trade name "NutriSphere-N® for Liquid Nitrogen Fertilizers" from Specialty Fertilizer Products, LLC (publication date unknown, printed from the web on Sep. 9, 2010, available at http://www.nutrisphere-n.com/products.aspx).

Presently available label for prior art product commercially available under the trade name "AVAIL® for Granular Phosphates" from Specialty Fertilizer Products, LLC (publication date unknown, printed from the web on Sep. 9, 2010, available at http://www.chooseavail.com/products.aspx).

Presently available label for prior art product commercially available under the trade name "AVAIL® for Liquid Phosphates" from Specialty Fertilizer Products, LLC (publication date unknown, printed from the web on Sep. 9, 2010, available at http://www.chooseavail.com/products.aspx).

Jaykisor et al. "Modification of Lldpe Using Esterified Styrene Maleic Anhydride Copolymer: Study of its Properties and Environmental Degradability." J. Appl Polym Sci 92.1 (2004):102-108.

Kansoh et al. "Studies on the Antifungal Activities of the Novel Synthesized Chelating Copolymer Emulsion Lattices and Their Silver Complexes." Base 12.3 (2008): 231-238.

Kotzeva et al. "On the Kinetics and Mechanism of Copolymerization of Vinyl Acetate and Itaconic Monomers." J. Polym Sci Part A: Polymer Chemistry 27.4 (2003):1325-1332.

Kotzeva et al. "Alcoholysis of Copolymers of Vinyl Acetate with Itaconic Acid." J. Appl Polym Sci 39.7 (2004):1419-1424.

Lanthong et al. "Graft Copolymerization, Characterization, and Degradation of Cassava Starch-g-acrylamide/itaconic Acid Superabsorbents." Carbohydrate Polymers (2006): 229-245.

Yang et al. "In-situ Polymerization of Maleic Acid and Itaconic Acid on Cotton: MALDI/TOF Mass Spectroscopy and Light-Scattering Stud." Textile Research Journal 70.4 (2000): 359-362.

Yang et al. "Polymerization of Maleic Acid and Itaconic Acid Studied by Ft-raman Spectroscopy." J Appl Polym Sci 81.1 (2001): 223-228.

You et al. "Synthesis and Swelling Behavior of Crosslinked Copolymers of Neutralized Maleic Anhydride with Other Monomers." J. Appl Polym Sci 88.12 (2003): 2725-2731.

Unknown. "Biodegradable Coating Improves Crop Yields." JCT Coatings Tech 4.4 (2007): 30-31. [Accession No. R: 996031 RAPRA].

U.S. Appl. No. 12/755,241, filed Apr. 6, 2010 Prosecution History.

International Search Report and Written Opinion; PCT/US2010/020350; Aug. 20, 2010.

* cited by examiner

QUICK DRYING POLYMERIC COATING

CROSS-REFERENCE TO RELATED APPLICATION

This is a continuation of application Ser. No. 12/651,356 of the same title filed Dec. 31, 2009, which is a continuation-in-part of application Ser. No. 12/351,589 filed Jan. 9, 2009, and entitled QUICK DRYING POLYMERIC FERTILIZER ADDITIVE. Both of these prior applications are incorporated in their entirety by reference herein.

BACKGROUND OF THE INVENTION

1. Field of the Invention

The present invention is broadly concerned with improved agriculturally useful, quick drying coating compositions and methods wherein the compositions include one or more polycarboxylated polymer salt and a volatile organic drying agent. More particularly, the invention is concerned with such compositions and methods wherein a copolymer containing respective quantities of maleic and itaconic moieties is supplemented with a volatile drying agent, which may be mixed with or coated onto solids, such as solid nitrogenous fertilizer. In another aspect of the invention, improved drying times are provided by adding boron, especially in conjunction with vinylic polymer(s) having a majority of pendent functional groups thereof as alcohols, and optionally containing both relatively low and high molecular weight (MW) polymer fractions, to the copolymer-organic drying agent compositions.

2. Description of the Prior Art

U.S. Pat. No. 6,515,090 describes a highly useful class of copolymers which have been employed to good effect in a number of agricultural applications. For example, the '090 patent discloses copolymers made up of varying percentages of maleic and itaconic moieties, and salts thereof, which can be applied to solid fertilizers to achieve surprising increases in yields. In normal practice, an aqueous copolymer mixture is applied by spraying or other means onto solid fertilizers to provide fertilizer-polymer compositions.

Specialty Fertilizer Products, LLC of Leawood, Kans., commercializes a series of copolymers under the '090 patent. One such polymer, Nutrisphere-N® for granular nitrogen fertilizers, is especially designed to be applied to a variety of solid or granular nitrogen fertilizers, such as urea, ammonium salts, MAP, or DAP. This product is an approximately 40% by weight solids aqueous dispersion of a 1:1 partial calcium salt copolymer of maleic and itaconic moieties having a pH of from about 3.25-3.75.

However, it has been found that, depending principally upon the moisture content of the solid fertilizer, suboptimal field application procedures, or adverse ambient conditions such as very high humidity or low temperatures, problems with successful application of the above-mentioned compositions can arise. Specifically, the compositions are sprayed or otherwise deposited on the outer surfaces of solid fertilizers and the water is allowed to evaporate by mass transfer, leaving a solid polymer residue coating. However, if the composition drying time is excessive resulting in incomplete drying of the compositions, the coated products can be difficult to handle and apply. Indeed, in certain cases, relatively wet solid fertilizers with applied aqueous copolymer can create agglomerations within field application equipment making it difficult or even impossible to evenly spread the compositions across fields.

Mixtures of certain polycarboxylated polymers and organic solvents are known, see U.S. Pat. No. 5,868,964, e.g., polyacrylic acid polymer plus methanol. However, owing to the type of polymer used, and/or the concentration of organic solvent, the polymer and solvent are essentially incompatible, resulting in viscous precipitates unsuitable for use in fertilizer compositions. Polycarboxylate polymer salts do not usually form stable solutions in the presence of significant concentrations of organic solvents such as methanol.

There is accordingly a need in the art for improved agricultural products such as solid fertilizers in contact with quick-drying polycarboxylated polymers, so as to alleviate polymer coating and drying problems, while at the same time not detracting from the yield benefits obtained using such polymers.

SUMMARY OF THE INVENTION

The present invention overcomes the problems outlined above and provides improved polymer-containing, quick drying compositions designed for application with or onto various solids such as fertilizers, methods of forming the quick drying compositions and polymer-supplemented solid products, and methods of fertilizing soil to enhance plant growth using polymer-coated fertilizer compositions.

In broad outline, the fertilizer compositions of the invention include a quantity of a solid, fertilizer and a polymer-containing composition in contact with the solid fertilizer. The polymer-containing composition as initially formulated and contacted with fertilizer includes a salt of a polycarboxylated polymer, namely a salt of a copolymer containing individual quantities of maleic and itaconic moieties, along with a volatile organic drying agent or solvent. Thereafter, the drying agent evaporates, along with a substantial part of any water present, so that the fertilizer composition as applied to a field normally does not contain these components to any substantial degree, but rather is made up of the fertilizer plus the residue copolymer salt. Surprisingly, it has been found that the selected polymer salts can be mixed with very high concentrations of organic drying agent to produce stable liquid polymer-containing compositions free of the incompatibility problems of the prior art. The final fertilizer composition can be prepared by applying such a polymer-containing composition directly onto the surface of solid fertilizer at levels which enhance the plant growth and yield characteristics of the complete fertilizer compositions, while at the same time causing the rapid vaporization of excess moisture from the fertilizer compositions. This assures that the fertilizer compositions can be field-applied using normal spreaders or the like without the difficulties encountered with prior fertilizer compositions.

The methods of use of the fertilizer compositions involve applying the compositions onto soil adjacent planted seeds or growing plants at normal nitrogen levels.

Further improved results are realized when the above-described polymeric coating compositions are supplemented by a minor amount of boron (usually in the form of boric acid). Still more advantageous is the use of boron in conjunction with a vinylic polymer, preferably polyvinyl alcohol (PVA), having a majority of the pendant functional groups thereof as alcohols. Still more preferably, the vinylic polymer additive is in the form of a bimodal polymer having respective fractions of high MW and low MW vinylic polymer.

It has been found that the fertilizer compositions of the invention provide significant increases in crop yields, and that the presence of organic drying agents and other ingredients do not impede or otherwise alter such yield enhancements.

DETAILED DESCRIPTION OF THE PREFERRED EMBODIMENTS

The present invention is predicated upon the discovery that solid agriculturally useful products such as fertilizers can be improved through the use of quick drying polymeric compositions added to or applied onto the solid products. Such drying agents facilitate and enhance the vaporization of moisture from the products, allowing easy use thereof.

Virtually any fertilizer may be treated with the polymeric compositions of the invention in order to lessen the formation of dust and to enhance the fertilizer efficiency thereof. In preferred forms, however, nitrogen-bearing or nitrogenous fertilizers are improved in accordance with the invention. For example, urea, ammonium sulfate, ammonium nitrate and mixtures thereof are prime candidates for use in the invention, and can be in any solid form such as prills or granules. The single most preferred solid fertilizer is granular urea.

As indicated above, the polycarboxylated polymers of the invention are substantially water soluble and selected from the group consisting of copolymers in acid form or as partial salts containing respective quantities of maleic and itaconic moieties. These polymers preferably exist as partial salts, and can include mixtures of different salts. Virtually any desired cationic species may be used in the formation of the polymeric salts from starting acid polymers, particularly the alkali metals, alkaline earth metals, ammonia, and the alkylamines (e.g., C1-C6 alkylamines such as triethylamine). The polymer salts of the invention are preferably in the form of aqueous dispersions, but non-aqueous organic dispersions may also be used.

The basic copolymers are described in U.S. Pat. No. 6,515,090, fully and completely incorporated by reference herein. In general, the copolymer salts should desirably contain from about 10-90% maleic moieties (more preferably from about 25-75%), and correspondingly from about 90-10% itaconic moieties (more preferably from about 75-25%). The copolymers may also contain other moieties apart from maleic and itaconic moieties, such as vinyl moieties. However, such other moieties should be present only up to a level of about 7%, i.e., the copolymers should contain about 93% maleic and itaconic moieties. Preferably, the copolymers consist essentially of maleic and itaconic moieties. One particularly preferred copolymer salt of this class is the previously-described Nutrisphere-N® for solid nitrogen fertilizers. More generally, such copolymer salts are preferably formed by the addition of a basic material (e.g., Ca, Mg, K, Na in the form of the oxides, hydroxides, or carbonates thereof) to achieve a desired pH in aqueous mixture, normally in the range of from about 1-4.

The volatile organic drying agent may be made up of one or more organic compounds, and is preferably selected from the group consisting of organic alcohols and ketones, and particularly the C1-C4 alkyl alcohols. For reasons of cost, ease of use and vapor pressure characteristics, methanol is the most preferred drying agent. More broadly, however, the drying agent may be selected from the group consisting of one or more organic compounds having a vapor pressure of at least about 40 mmHg at Standard Temperature and Pressure (STP). This embraces many of the preferred lower alcohols such as methanol (127 mmHg), ethanol (59 mmHg) and isopropanol (42.7 mmHg).

The selected drying agent and polymer salt are preferably mixed together to form a polymer-containing composition designed to be applied to solid products such as nitrogenous fertilizers. In such cases the polymer-containing composition normally comprises the polymer salt dissolved, suspended, or dispersed in a liquid phase comprising water and the drying agent. The drying agent is normally used at a level of from about 5-60% by weight (more preferably about 30-50% by weight, and most preferably about 35-45% by weight) of the complete polymer-containing composition. Use of higher levels of drying agent with the simultaneous presence of high polymer solids concentration may require partial or essentially complete water removal by evaporation or other known means from the starting copolymer salt aqueous material. Thus, a preferred polymer-containing composition may include from about 20-70% by weight of copolymer salt (more preferably from about 30-60% by weight), from about 30-50% by weight drying agent (more preferably from about 35-45% by weight), and from about 10-50% by weight water (more preferably from about 10-25% by weight). An example of such a polymer-containing composition would include about 40% by weight maleic-itaconic copolymer salt, about 45% by weight methanol, and about 15% by weight water, and would have a pH 1-4 and a flash point of 74° F. Generally, the polymeric compositions should have a flash point of greater than 73° F.

Additional benefits are realized when compositions as described above are supplemented with boron alone, and more preferably in combination with bimodal vinylic polymers containing both high and low MW fractions. As used herein, "vinylic polymer" refers to any polymer or copolymer wherein a plurality of the repeat groups therein are vinyl alcohol moieties. Generally, the low molecular weight vinylic polymer is used in a greater quantity than the high molecular weight materials, typically at ratios of from about 1:2 to 1:20, more preferably from about 1:4 to 1:12, of the high MW to low MW materials.

The paradigm vinylic polymer is PVA. A large variety of PVAs are available commercially, and are typically distinguished on the bases of molecular weight and hydrolysis level, both ranging from "low" to "high." Low MW PVAs have a number averaged molecular weight Mn in the range of up to about 15,000 (e.g., from about 7,000-13,000) and a weight averaged molecular weight Mw in the range of about 25,000 (e.g., from about 13,000-23,000). These materials also have hydrolysis values of from about 98.0-98.8% by mole, and a viscosity of from about 3.5-4.5 cps (as 4% aqueous solutions at 20° C.). High MW PVAs have an Mn of about 70,000-101,000 and an Mw of 145,000 and above (e.g., from about 146,000-186,000), hydrolysis values of 99.3+% by mole, and viscosities of from about 62-72 cps (as 4% aqueous solutions at 20° C.).

Normally, PVA or other polymeric molecular weights in commercial products have a distribution of molecular weights within some range. This distribution may be relatively wide or quite narrow, depending on the specifics of a given product. Hence, these materials of mixtures are often described by means of various averaged molecular weights (number or weight averaged), and this is useful in understanding the properties of the products since a very large percentage of all molecules in the sample and a large fraction of the weight of the sample will have molecular weights close to the averages. It is also common to depict molecular weight distributions in polymers by means of a diagram having molecular weight along a horizontal axis and the relative abundance of molecules along a vertical axis. In the case of most polymer compositions, such diagrams are generally hump-shaped, typically having a single peak where the apex thereof represents the weight which is the most common molecular weight in the polymer composition; this is often termed the "peak molecular weight," referring to the weight of the highest fraction of polymer molecules, and not the highest molecular weight in the composition. However, a bimodal vinylic polymer composition of the invention exhibits two humps or peaks in such a molecular weight diagram. If an average molecular weight measurement is taken of such a bimodal system, highly misleading results may occur, because there will be relatively few molecules near such an "average" value. Thus, a bimodal and single mode polymer composition may have the same "average" molecular weights, yet having very different physical properties.

In the present invention, it was found that better results may be obtained using bimodal vinyl polymer compositions having high and low MW fractions, as compared with a normal composition of the same average molecular weight. Use of bimodal compositions gives the best features of both high and low molecular weight polymers.

The preferred bimodal PVA is made up of individual amounts of low and high MW PVA, with the low MW PVA being present at a level of from about 0.5-10% by weight of the complete fertilizer coating composition, whereas the high MW PVA is present at a level of from about 0.1-4% by weight. The low MW PVA fraction is normally present in an amount greater than that of the high MW PVA fraction, with the previously-described high MW/low MW ratios being applicable.

It is well known that PVAs are highly biodegradable, water-soluble polymers that possess a range of properties, both in pure form and in solution. Such properties can make it difficult to formulate mixtures in certain situations. Thus, it is known that PVAs are at best poorly soluble in solutions that contain significant amounts of organic solvents, and precipitate in their presence. This is especially true of high or super-high hydrolysis level grades of PVA, which simply do not dissolve in solutions having significant organic solvent levels in addition to water. It is also known that PVA reacts rapidly with borates to form what is conventionally called "silly putty" or "slime," which are insoluble crosslinked plastic materials.

PVAs of high or super-high hydrolysis levels can be used to create coatings that are smooth and non-hygroscopic. Unfortunately, such PVAs possess very high viscosities and tend to make formulations which gel upon standing. Thus, these materials are per se impractical for fertilizer coating uses. On the other hand, low hydrolysis level PVAs exhibit low viscosities, but exhibit relatively high hygroscopic properties.

Unexpectedly, it has been discovered that combinations of boron with selected PVAs avoid the formation of insolubles while also retaining most of the water resistance of high MW PVA and the low viscosity properties of low MW PVA. Particularly preferred in this context are the bimodal PVA compositions.

Preferred complete quick drying polymeric compositions in accordance with the invention include: (1) from about 20-50% by weight of one of more of the previously described maleic-itaconic copolymers (more preferably from about 35-45% by weight), advantageously in the form of the preferred partial calcium salt copolymer, with carboxylate substitution by calcium at levels of from about 1-35% (more preferably from about 10-30%) of the carboxylates present, and a corresponding pH of from about 2.35-3.75 when the copolymer is in aqueous dispersion; (2) volatile organic solvent, preferably methanol, at a level of from about 5-60% by weight (more preferably from about 35-50% by weight); (3) low MW PVA at a level of from about 0.5-10% by weight (more preferably from about 2-6% by weight); (4) high MW PVA at a level of from about 0.1-4% by weight (more preferably from about 0.2-2% by weight); (5) a ratio of high MW PVA to low MW PVA of from about 1:2 to 1:20 (more preferably from about 1:4 to 1:12); (6) boric acid at a level of from about 0.5-5% by weight (more preferably from about 2-4% by weight); and (7) water as the balance of the composition. Such a preferred coating composition typically has a solids level of from about 25-55% by weight, more preferably from about 35-50% by weight.

Generally, the bimodal PVA is mixed with the maleic-itaconic copolymer with heating to a level of from about 80-110° C. and agitation for a period of time to assure that the PVA fractions dissolve. The organic drying agent is then added with additional stirring, followed by boric acid addition. In preferred preparative procedures, an aqueous maleic-itaconic copolymer mixture at about 35% w/w solids content is placed in a reactor at room temperature and stirred vigorously. The low and high MW PVAs are then added, and the mixture is heated to 97° C. with continued vigorous stirring. This mixture is allowed to cook for 45 minutes at 97° C. to insure that all of the PVA materials dissolve. Vacuum distillation of the mixture is then initiated until it reaches a desired solids concentration of approximately 60-70% w/w, whereupon the mixture is allowed to cool to room temperature. Methanol is then added with vigorous stirring until the mixture becomes homogeneous. Finally, boric acid is added with further stirring until fully dissolved. The complete polymeric composition contains approximately 40% solids w/w.

The polymeric compositions made up of an aqueous copolymer salt and drying agent, with or without bimodal vinylic polymer and boron, can be applied to agriculturally useful solid products such as solid fertilizers by any convenient means, such as by spraying or dipping. The preferred polymeric compositions were found to be unexpectedly and surprisingly compatible and do not separate or precipitate solids. In general, the polymer-containing compositions are applied at a level of from about 0.1-1 gallons of polymer-containing composition per ton of fertilizer or other solid product (more preferably at a level of from about 0.3-0.8 gallons).

Although in preferred forms the ingredients of the coating compositions are mixed together to form complete products before application to solid fertilizer, it would be possible to separately apply the copolymer salt, drying agent, and other ingredients, especially if done substantially simultaneously or in quick succession. In such cases, the rate of application would be the same as that set forth above, considering the makeup of the two different applied substances. Moreover, the polymer compositions of the invention can be used on a variety of agriculturally useful products, such as seeds or soil amendments.

The quick drying compositions hereof may also be formulated including various dyes, pigments, colorants, tracing agents, etc. Such practices are well known in the agricultural arts. It is known that many dyes have poor compatibility with entirely aqueous formulations of high ionic strength. However, it was found that the present compositions containing appreciable volatile organic components can more readily be supplemented with such dyes, and the effectiveness thereof in imparting color to solid fertilizers is enhanced by the presence of the preferred PVA.

The following Examples set forth preferred polymer-containing quick drying compositions of the invention and uses thereof. It is to be understood, however, that this example is provided by way of illustration and nothing therein should be taken as a limitation upon the overall scope of the invention.

Example 1

A fertilizer composition was prepared by applying a liquid polymer-containing composition onto granular urea at a rate of ½ gallon of the liquid polymer-containing composition per ton of urea (urea+aqueous-methanol Nutrisphere-N®). The polymer-containing composition was made up of the above-described Nutrisphere-N® copolymer salt.

Another fertilizer composition was prepared using the aqueous Nutrisphere-N® product applied at the same rate as above onto granular urea, but without the methanol drying agent (urea+aqueous Nutrisphere-N®).

A final test fertilizer was straight uncoated urea (uncoated urea).

These three fertilizer compositions were field-tested to determine the effect of the methanol drying agent on yields. This test was conducted in Courtland, Kans. in Crete silt loam soil, pH 6.5, organic matter 2.2%, Bray P-one ranging from 19 ppm, soil test potassium 380 ppm ammonium acetate extractable K. A no-till irrigated corn was planted (May 2) at 32,000 plants/acre on 6 test plots. The planted corn received a fluid fertilizer starter (10-34-0) at a rate of 8 gal. per acre, banded 2×2 beside each row. Sprinkler irrigation water was provided from the Lovewell Reservoir in north central Kansas.

The respective solid fertilizer compositions were applied at two rates, 160 and 240 lb. Nitrogen per acre, as a broadcast application immediately after corn planting. The 6 test plots were: uncoated urea/160 lb. N/A; urea+aqueous Nutrisphere-N/160 lb. N/A; urea+aqueous-methanol Nutrisphere-N/160 lb. N/A; uncoated urea/240 lb. N/A; urea+aqueous Nutrisphere-N/240 lb. N/A; and urea+aqueous-methanol Nutrisphere-N/240 lb. N/A. There was no incorporation of N into the soil except that which occurred via sprinkler irrigation.

The test plots were harvested November 2 by a plot combine taking the two center rows of each plot. Yield data was reported at 15.5% moisture.

Corn yield responses to the respective solid fertilizers were consistent and highly significant statistically (95% confidence interval). The magnitude of improvement in yield of no-till corn receiving urea+aqueous-methanol Nutrisphere-N versus uncoated urea was similar to that of urea+aqueous Nutrisphere-N polymer (Table 1).

These data indicate that the coating of urea with a high charge density copolymer salt has significant effects upon N use by corn with subsequent increases in corn yield and potential profitability for the grower. These data further confirm that the presence of the drying agent has no deleterious effects upon the performance of the polymer-coated urea.

TABLE 1

Enhancing N Availability for Irrigated Corn

| Treatments lb N/A | Form of N | Grain Yield bu/A |
|---|---|---|
| 160 | Uncoated urea | 173 b* |
| 160 | Urea + Nutrisphere-N ® | 193 a |
| 160 | Urea + Experimental formulation | 196 a |
| 240 | Uncoated urea | 180 b |
| 240 | Urea + Nutrisphere-N ® | 196 a |
| 240 | Urea + Experimental formulation | 197 a |

$LSD_{.05}$ 11

CV % 3.8

*Means separated by Duncan's multiple range test

Example 2

In this Example, a series of drying tests were conducted using various compositions including Nutrisphere-N® for granular nitrogen fertilizers (referred to as "Polymer" in Table 2 below), described above.

The formulations included various amounts of methanol and certain had minor amounts of boric acid therein. Additionally, low and high molecular weight PVA was added to certain of the formulations. The low molecular weight PVA (Celvol 103 sold by Celanese Chemical) had a variable molecular weight, a hydrolysis 98.4±0.4% by mole, and a viscosity of 4.0±0.5 cps (4% solution). The high molecular weight PVA (Celvol 165 sold by Celanese Chemical) had a variable molecular weight, a hydrolysis of 98.4±0.4% by mole, and a viscosity of 67±5.0 cps (4% solution).

In each test, one drop of the corresponding polymeric formulation was placed on a petrie dish, followed by stirring with the tip of a pipette until the formulation was completely dry. The formulations and drying times are set forth in Table 2.

TABLE 2

| Formulation No. | Polymer % w/w | Methanol % w/w | Boric Acid % w/w | Low MW PVA % w/w | High MW PVA % w/w | Water % w/w | Total Solids % w/w | Drying Time (min) |
|---|---|---|---|---|---|---|---|---|
| 1 | 40.8 | 0.0 | 0.0 | 0.0 | 0.0 | 59.2 | 40.8 | 4.1 |
| 2 | 40.0 | 44.0 | 0.0 | 0.0 | 0.0 | 16.0 | 40.0 | 3.0 |
| 3 | 39.0 | 43.0 | 3.0 | 0.0 | 0.0 | 15.0 | 42.0 | 2.4 |
| 4 | 35.0 | 35.0 | 0.0 | 4.5 | 0.5 | 25.0 | 40.0 | 4.5 |
| 5 | 36.2 | 38.1 | 2.9 | 3.3 | 0.5 | 19.0 | 42.9 | 1.0 |

The above data demonstrates that improved drying times were realized in formulations 2, 3, and 5, as compared with the basic Nutrisphere-N® of Formulation 1. Surprisingly, the addition of boric acid (Formulation 3) also significantly decreased drying times as compared with Formulation 2. The best drying times were obtained through the use of Formulation 5, including the use of bimodal PVA. This was an unexpected result, because Formulation 5 contains significantly more water than Formulations 2 and 3, with a similar solids content. It is theorized that a synergistic effect is obtained through the formation of a polymer-boron-PVA adduct, which exhibits very short drying times.

Inasmuch as conventional granular nitrogen fertilizer products are typically coated to render them hard and resistant to moisture sorption, the petrie dish results of this test are predictive in a relative sense of the drying times of the formulations when applied to solid nitrogen fertilizers.

We claim:

1. A method of treating soil comprising the steps of:
    forming a composite comprising an agriculturally useful solid product and an aqueous polymer-containing composition applied to said solid product, said composition having a pH of from about 1-4 and including a substantially water-soluble copolymer containing individual quantities of maleic and itaconic moieties, water, and an organic compound drying agent selected from the group consisting of organic alcohols and ketones,
    said composite further including from about 0.5-5% by weight boron as boric acid, and an amount of bimodal polyvinyl alcohol (PVA) having individual high and low molecular weight (MW) fractions, said low molecular weight fraction comprising low MW PVA having a weight averaged molecular weight of from about 13,000-23,000, said high MW PVA having a weight averaged molecular weight of about 145,000 and above, said low MW PVA being present in an amount greater than said high MW PVA;
    allowing said drying agent and a substantial part of the water present in the composite to evaporate, so that the composite does not contain said drying agent or water to any substantial degree; and
    applying said formed and dried composite to soil.

2. The method of claim 1, said copolymer containing from about 10-90% maleic moieties, and from about 90-10% itaconic moieties.

3. The method of claim 1, said copolymer consisting essentially of said maleic and itaconic moieties.

4. The method of claim 1, said drying agent selected from the group consisting of C1-C4 alcohols.

5. The method of claim 1, said organic drying agent being present at a level of from about 5-60% by weight.

6. The method of claim 1, said copolymer being in partial salt form and having at least about 93% itaconic and maleic moieties.

7. The method of claim 1, said composition comprising from about 20-70% by weight of said copolymer in partial salt form, from about 5-60% by weight methanol, and from about 10-50% by weight water.

8. The method of claim 7, said copolymer salt being present at a level of from about 30-60% by weight, from about 30-50% by weight methanol, and from about 10-25% by weight water.

9. The method of claim 1, the ratio of said high MW PVA to said low MW PVA being from about 1:2 to 1:20.

10. The method of claim 9, said ratio being from about 1:4 to 1:12.

11. The method of claim 1, said polymer-containing composition comprising:
    (1) from about 20-50% by weight of maleic-itaconic copolymer, in the form of a partial salt and having at least about 93% itaconic and maleic moieties therein;
    (2) volatile organic solvent present at a level of from about 5-60% by weight;
    (3) low MW PVA at a level of from about 0.5-10% by weight;
    (4) high MW PVA at a level of from about 0.1-4% by weight;
    (5) a ratio of high MW PVA to low MW PVA of from about 1:2 to 1:20;
    (6) boric acid at a level of from about 0.5-5% by weight; and
    (7) water.

12. The method of claim 11, wherein:
    (1) said maleic-itaconic copolymer consists essentially of maleic and itaconic moieties and is present as a partial calcium salt with carboxylate substitution by calcium at a level of from about 1-35%, and in an amount of from about 35-45% by weight;
    (2) said organic solvent comprises methanol and is present at a level of from about 35-50% by weight;
    (3) said low MW PVA is present at a level of from about 2-6% by weight and has a weight averaged molecular weight Mw of from about 13,000-23,000;
    (4) said high MW PVA is present at a level of from about 0.2-2% by weight and has a weight averaged molecular weight Mw of from about 146,000-186,000;
    (5) said ratio is from about 1:4 to 1:12;
    (6) said boric acid is present at a level of from about 2-4% by weight; and
    (7) water forms the balance of said composition.

13. The method of claim 1, said solid product being fertilizer.

14. The method of claim 13, said fertilizer selected from the group consisting of urea, ammonium sulfate, ammonium nitrate, and mixtures thereof in the form of granules or prills.

15. The method of claim 14, said composition applied to the surface of said fertilizer at a level of from about 0.1-1 gallons of said polymer-containing composition per ton of said solid fertilizer.

* * * * *